United States Patent
Lei et al.

(10) Patent No.: US 12,550,005 B2
(45) Date of Patent: Feb. 10, 2026

(54) METHOD FOR ADJUSTING BLOCK ERROR RATE, AND COMMUNICATION NODE AND STORAGE MEDIUM

(71) Applicant: ZTE CORPORATION, Shenzhen (CN)

(72) Inventors: Chaoqin Lei, Shenzhen (CN); Qiaoyan Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 261 days.

(21) Appl. No.: 18/562,119

(22) PCT Filed: May 19, 2022

(86) PCT No.: PCT/CN2022/093752
§ 371 (c)(1),
(2) Date: Nov. 17, 2023

(87) PCT Pub. No.: WO2022/242702
PCT Pub. Date: Nov. 24, 2022

(65) Prior Publication Data
US 2024/0244486 A1    Jul. 18, 2024

(30) Foreign Application Priority Data

May 19, 2021   (CN) .......................... 202110546563.0

(51) Int. Cl.
*H04W 28/18*     (2009.01)
*H04B 17/345*    (2015.01)
(Continued)

(52) U.S. Cl.
CPC .......... *H04W 28/18* (2013.01); *H04B 17/345* (2015.01); *H04L 5/0073* (2013.01); *H04L 43/0823* (2013.01); *H04L 43/16* (2013.01)

(58) Field of Classification Search
None
See application file for complete search history.

(56) References Cited

U.S. PATENT DOCUMENTS

2012/0270584 A1* 10/2012 Liang .................... H04W 48/16
                                                            455/507
2015/0236808 A1    8/2015 Liu et al.
(Continued)

FOREIGN PATENT DOCUMENTS

CN       1862992 A    11/2006
CN     102469521 A     5/2012
(Continued)

OTHER PUBLICATIONS

International Search Report in Application No. PCT/2022/093752, dated Aug. 17, 2022, 4 pages, including translation.
(Continued)

*Primary Examiner* — Anh Ngoc M Nguyen
(74) *Attorney, Agent, or Firm* — Morgan, Lewis & Bockius LLP (57) ABSTRACT

A method for adjusting a block error rate includes: when a block error rate (BLER) of an edge user equipment (UE) is a preset value, acquiring a resource block (RB) utilization ratio of each interference neighbor cell of at least one interference neighbor cell of the edge UE; determining whether an RB utilization ratio of each target interference neighbor cell is less than a first preset threshold of the each target interference neighbor cell, where the at least one target interference neighbor cell is N interference neighbor cells in the at least one interference neighbor cell that satisfy a preset condition for interfering with the edge UE, and N is a positive integer; and when the RB utilization ratio of the each target interference neighbor cell is less than the first
(Continued)

preset threshold of the each target interference neighbor cell, increasing the BLER of the edge UE.

15 Claims, 3 Drawing Sheets

(51) Int. Cl.
*H04L 5/00* (2006.01)
*H04L 43/0823* (2022.01)
*H04L 43/16* (2022.01)

(56) References Cited

U.S. PATENT DOCUMENTS

2015/0282202 A1* 10/2015 Miao ................. H04W 72/54
 370/329
2021/0314883 A1* 10/2021 Latheef ............... H04W 52/365

FOREIGN PATENT DOCUMENTS

| | | |
|---|---|---|
| CN | 108990078 A | 12/2018 |
| WO | 2020190181 A1 | 9/2020 |
| WO | 2020190182 A1 | 9/2020 |

OTHER PUBLICATIONS

Extended European Search Report in Application No. 22804022.6, dated Mar. 28, 2025, 9 pages.

* cited by examiner

METHOD FOR ADJUSTING BLOCK ERROR RATE, AND COMMUNICATION NODE AND STORAGE MEDIUM

CROSS REFERENCE TO RELATED APPLICATIONS

This is a national stage application filed under 37 U.S.C. 371 based on International Patent Application No. PCT/CN2022/093752, filed on May 19, 2022, which claims priority to Chinese Patent Application No. 202110546563.0 filed with the China National Intellectual Property Administration (CNIPA) on May 19, 2021, the disclosures of which are incorporated herein by reference in their entireties.

TECHNICAL FIELD

The present application relates to the field of communications, for example, a method for adjusting a block error rate, a communication node and a storage medium.

BACKGROUND

With the rapid development of wireless communication technology, the demand of users for traffic is increasing. Generally, under the network coverage of a cell, the closer a user is to a base station, the greater the strength of the received signal is, while the farther a user is from a base station, the lower the strength of the received signal is. Moreover, the users far from the base station are strongly affected by the interference from the surrounding cells and have a poor network experience, which may become a bottleneck in the network communication technology. Therefore, how to improve the traffic of this part of users and their user experience becomes an urgent problem to be solved at present.

SUMMARY

Embodiments of the present application provide a method for adjusting a block error rate, a communication node and a storage medium, and the block error rate (BLER) of an edge user equipment (UE) is adaptively adjusted by using the load condition of interference neighbor cells of the edge UE, thereby increasing the throughput of the edge UE and improving the user experience.

The embodiments of the present application provide a method for adjusting a block error rate. The method includes the following.

In a case where a BLER of an edge UE is a preset value, a resource block (RB) utilization ratio of each interference neighbor cell of at least one interference neighbor cell of the edge UE is acquired.

Whether an RB utilization ratio of each target interference neighbor cell of at least one target interference neighbor cell is less than a first preset threshold of the each target interference neighbor cell is determined, where the at least one target interference neighbor cell is N interference neighbor cells for interfering with the edge UE in the at least one interference neighbor cell that satisfy a preset condition, and N is a positive integer.

In a case where the RB utilization ratio of the each target interference neighbor cell is less than the first preset threshold of the each target interference neighbor cell, the BLER of the edge UE is increased.

The embodiments of the present application further provide a communication node. The communication node includes a processor, and the processor is configured to, when executing a computer program, implement the method in any of the embodiments described above.

The embodiments of the present application provide a computer-readable storage medium. The computer-readable storage medium is configured to store a computer program, and the computer program, when executed by a processor, implements the method in any of the embodiments described above.

The preceding embodiments and other aspects of the present application and implementations thereof are described in more detail in the description of drawings, detailed description, and claims.

DETAILED DESCRIPTION

It is to be understood that the embodiments described herein are intended to explain the present application and are intended not to limit the present application.

Suffixes such as "module", "part" or "unit" used to indicate elements in the subsequent description are merely used to facilitate the description of the present application and have no particular meaning in themselves. Therefore, "module", "part" or "unit" may be used in a mixed manner.

Generally, under the network coverage of a cell, for users close to a base station, since the distance of these users from the base station is small and their road loss is low, the strength of the received signal is usually great, the interference affecting these users from the surrounding cells is also relatively small, and the signal-to-interference-plus-noise ratio of these users will not become a factor restricting the traffic. However, for users far from the base station, since the distance of these users from the base station is long and their road loss is high, the strength of the received signal is usually low; since these users are at the edge of the cell, these users are strongly affected by interference from the surrounding cells, and the signal-to-interference-plus-noise ratio of this part of users is low so that the experience of this part of users becomes a bottleneck in the network; for the operators, this part of users may become a centralized user group complaining about the poor quality of the network. Therefore, how to improve the traffic of this part of users and their user experience becomes an urgent problem to be solved at present. The embodiments of the present application provide a mobile communication network (which includes, but is not limited to, a 5th-generation (5G) mobile communication network). The network architecture of the network may include a terminal device and a network side device (which may also be referred to as a network device or an access network device). The terminal device is wirelessly connected to the network side device, and the terminal device may be fixed or movable. In the embodiments of the present application, a method for adjusting a block error rate, a communication node and a storage medium that are operable on the above-described network architecture are provided, and the BLER of an edge UE is adaptively adjusted by using the load condition of interference neighbor cells of the edge UE, thereby increasing the throughput of the edge UE under a medium-low load and improving the user experience. The network side device is an access device through which the terminal device wirelessly accesses a mobile communication system and may be a base station, an evolved NodeB (eNodeB), an integrated access and backhaul (IAB), a relay node (RN), a transmission reception point (TRP), an access point (AP), a next generation NodeB (gNB) in the 5G mobile communication system, a base station in a future mobile communication system or an access node in a Wireless Fidelity (Wi-Fi) system. The network side device may also be a module or unit that implements part of the functions of the base station, for example, a central unit (CU), a distributed unit (DU), an integrated access and backhaul-mobile-termination (IAB-MT) or an IAB-DU. The embodiments of the present application do not limit the specific technology and the specific device form used for the network side device.

The terminal device may also be referred to as a terminal, a UE, a mobile station or a mobile terminal. The terminal device may be a mobile phone, a tablet computer, a computer having wireless transceiving functions, a virtual reality terminal device, an augmented reality terminal device, a wireless terminal in industrial control, a wireless terminal in self-driving, a wireless terminal in telesurgery, a wireless terminal in a smart grid, a wireless terminal in transportation safety, a wireless terminal in a smart city, a wireless terminal in smart home, an IAB-MT, and the like. The embodiments of the present application do not limit the specific technology and the specific device form used for the terminal device.

The solutions provided by the embodiments of the present application will be described below in conjunction with the network side device and the terminal device. In the description of the present application, the terms "system" and "network" are often used interchangeably in the present application. Words such as "first" and "second" are used only for the purpose of differentiating descriptions and are not to be construed as indicating or implying relative importance or indicating or implying an order. A variety of embodiments of the present application described below may be performed alone or in combination with each other, and the embodiments of the present application are not specifically limited thereto.

The embodiments of the present application provide a method for adjusting a block error rate. The method includes: in a case where the BLER of an edge UE is a preset value, the RB utilization ratio of each interference neighbor cell of at least one interference neighbor cell of the edge UE is acquired; whether the RB utilization ratio of each target interference neighbor cell of at least one target interference neighbor cell is less than a first preset threshold of the each target interference neighbor cell is determined, where the at least one target interference neighbor cell is N interference neighbor cells for interfering with the edge UE in the at least one interference neighbor cell that satisfy a preset condition, and N is a positive integer; and in a case where the RB utilization ratio of each target interference neighbor cell is less than the first preset threshold of the each target interference neighbor cell, the BLER of the edge UE is increased.

Figure 1:
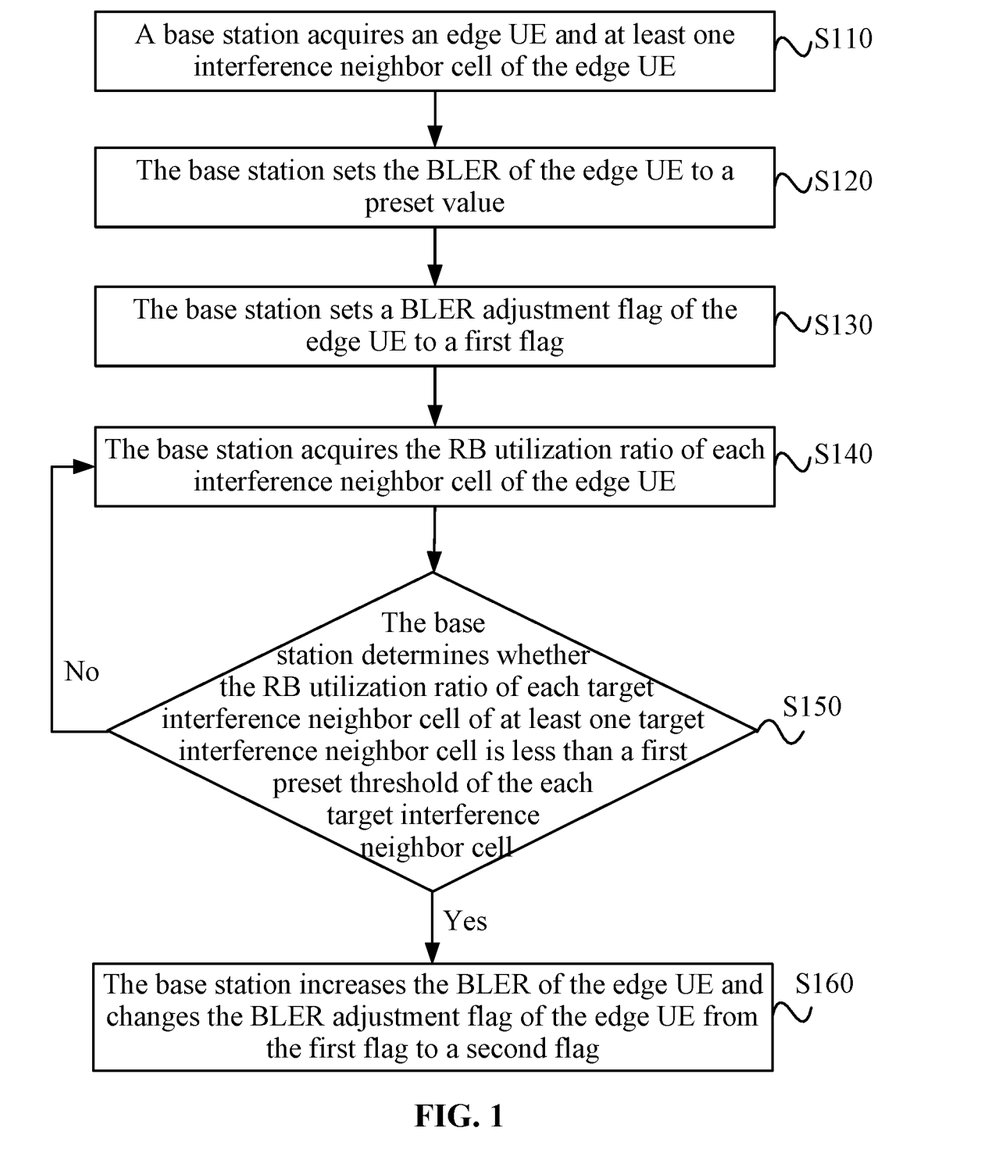
FIG. 1 is a flowchart of a method for adjusting a block error rate according to an embodiment of the present application.

FIG. 1 shows a flowchart of a method for adjusting a block error rate according to an embodiment. As shown in FIG. 1, the method provided in this embodiment is applicable to a network side device (for example, a base station). The method includes the following.

In S110, a base station acquires an edge UE and at least one interference neighbor cell of the edge UE.

In an embodiment, in S110, the base station may acquire the edge UE and at least one interference neighbor cell of the edge UE in the following manner: the base station receives a first event reported by the edge UE, where the first event includes an interference neighbor cell of the edge UE, and the first event is used for indicating that a difference between the received power of the interference neighbor cell of the edge UE and the received power of the cell in which the edge UE is located is not less than a preset threshold.

That is, in S110, the acquisition of the edge UE and at least one interference neighbor cell of the edge UE by the base station is achieved by configuring the first event (for example, event A3) by the cell: the UE that reports the event A3 to the base station is the edge UE, and at least one neighbor cell that the event A3 reports is the at least one interference neighbor cell of the edge UE. The event A3 is defined according to the protocol standards of the 3rd Generation Partnership Project (3GPP). When the UE determines through measurement that the difference between the received power of its neighbor cell and the received power of the cell in which the UE is located is not less than the preset threshold, the reporting of the event A3 is triggered.

Of course, in the present application, the edge UE and at least one interference neighbor cell of the edge UE may be acquired in other manners.

In S120, the base station sets the BLER of the edge UE to a preset value.

Each edge UE needs to set a BLER. The preset value may be understood as a default BLER value. In the embodiments of the present application, the default BLER values of different edge UEs may be the same or may be different.

In an embodiment, the preset value may be configured according to the protocol standards of the 3GPP and may also be configured according to other principles.

In S130, the base station sets a BLER adjustment flag of the edge UE to a first flag.

In an embodiment, the BLER adjustment flag of the edge UE may be an AdjustBLERFlag, and the AdjustBLERFlag is a UE-level variable, that is, one edge UE has one BLER adjustment flag.

Optionally, the first flag is 0, and a second flag is 1; or the first flag is 1, and the second flag is 0. Of course, the first flag and the second flag may also be selected as other values.

In S140, the base station acquires the RB utilization ratio of each interference neighbor cell of the edge UE.

It is to be understood that each cell may periodically count the RB utilization ratio of the each cell and send the RB utilization ratio to the surrounding interference cells.

In an embodiment, the RB utilization ratio of each interference neighbor cell of the edge UE is a cell-level RB utilization ratio or a bandwidth part (BWP)-level RB utilization ratio.

For a 4th-generation (4G) mobile communication network, the RB utilization ratio of each interference neighbor cell of the edge UE is a cell-level RB utilization ratio; and for 5G, the RB utilization ratio of each interference neighbor cell of the edge UE is a cell-level RB utilization ratio or a BWP-level RB utilization ratio.

In S150, the base station determines whether the RB utilization ratio of each target interference neighbor cell of at least one target interference neighbor cell is less than a first preset threshold of the each target interference neighbor cell, where the at least one target interference neighbor cell is N interference neighbor cells for interfering with the edge UE in the at least one interference neighbor cell that satisfy a preset condition, and N is a positive integer.

In an embodiment, the at least one target interference neighbor cell is N interference neighbor cells for interfering with the edge UE that satisfy a preset condition, for example, the at least one target interference neighbor cell may be N interference neighbor cells from which the interference to the edge UE is the strongest.

The value of N is determined according to the intensity of interference that affects the edge UE and computational complexity.

In addition, for different target interference neighbor cells, the values of the first preset thresholds may be the same or may be different.

When the RB utilization ratio of each target interference neighbor cell of the edge UE is a BWP-level RB utilization ratio, the base station determines whether the RB utilization ratio of each target interference neighbor cell is less than the first preset threshold of the each target interference neighbor cell by using the RB utilization ratio corresponding to a BWP activated by the edge UE.

In S160, if the RB utilization ratio of each target interference neighbor cell is less than the first preset threshold of the each target interference neighbor cell and the BLER adjustment flag of the edge UE is the first flag at this point, the base station increases the BLER of the edge UE and changes the BLER adjustment flag of the edge UE from the first flag to the second flag.

If the RB utilization ratio of at least one target interference neighbor cell of all target interference neighbor cells is greater than or equal to the first preset threshold of the at least one target interference neighbor cell, respectively, go to execute S140.

Figure 2:
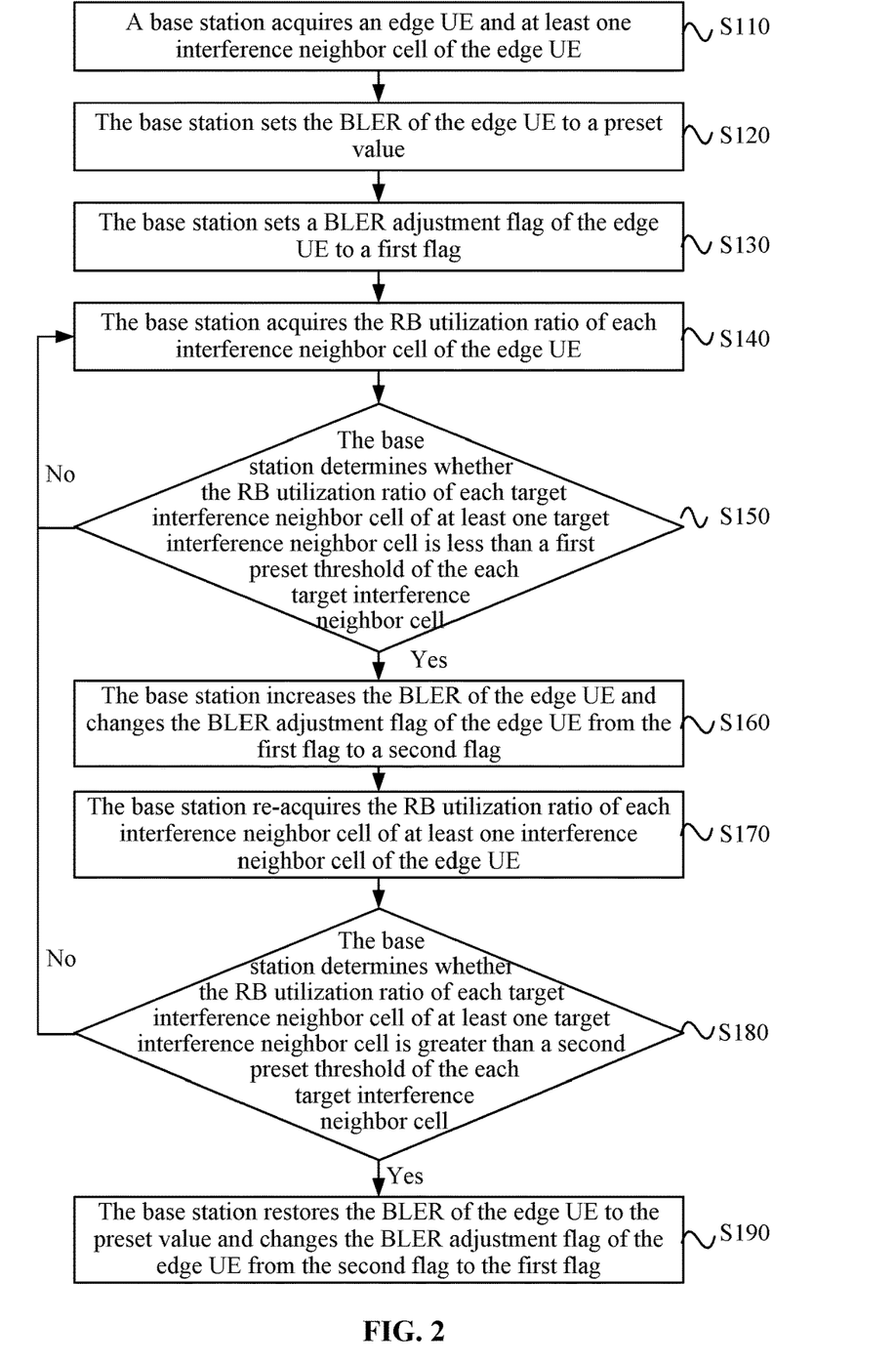
FIG. 2 is a flowchart of another method for adjusting a block error rate according to an embodiment of the present application.

On the basis of the preceding embodiments, in conjunction with FIG. 1, FIG. 2 shows a flowchart of another method for adjusting a block error rate according to an embodiment. As shown in FIG. 2, after S160, the method further includes S170 to S190.

In S170, the base station re-acquires the RB utilization ratio of each interference neighbor cell of at least one interference neighbor cell of the edge UE.

In S180, the base station determines whether the RB utilization ratio of each target interference neighbor cell of at least one target interference neighbor cell is greater than a second preset threshold of the each target interference neighbor cell.

In addition, for different target interference neighbor cells, the values of the second preset thresholds may be the same or may be different.

When the RB utilization ratio of each target interference neighbor cell of the edge UE is a BWP-level RB utilization ratio, the base station determines whether the RB utilization ratio of each target interference neighbor cell is greater than the second preset threshold of the each target interference neighbor cell by using the RB utilization ratio corresponding to a BWP activated by the edge UE.

In S190, if the RB utilization ratio of each target interference neighbor cell is greater than the second preset threshold of the each target interference neighbor cell and the BLER adjustment flag of the edge UE is the second flag at this point, the base station restores the BLER of the edge UE to the preset value and changes the BLER adjustment flag of the edge UE from the second flag to the first flag.

If the RB utilization ratio of at least one target interference neighbor cell of all target interference neighbor cells is less than or equal to the second preset threshold of the at least one target interference neighbor cell, respectively, go to execute S140.

Some example implementations are listed below to illustrate the method for adjusting a block error rate provided by the embodiments of the present application. The following example implementations may be performed alone or in combination.

In a first example implementation which is applicable to a 4G system, the method includes the following.

In S210, a base station acquires a UE1 belonging to a Cell1 and an interference neighbor cell Cell2 of the UE1.

The Cell1 configures event A3, and when the UE1 reports the event A3 and the neighbor cell that the event A3 reports is the Cell2, the UE1 is an edge UE, and the interference neighbor cell of the UE1 is the Cell2.

In S220, the base station sets the BLER of the UE1 to 10%.

In S230, the base station sets the BLER adjustment flag AdjustBLERFlag of the UE1 to 0.

In S240, the base station acquires the RB utilization ratio RBratio of the Cell2.

In S250, the base station determines whether the RB utilization ratio RBratio of the Cell2 is less than a first preset threshold that is 30% of the Cell2.

In S260, if the RB utilization ratio RBratio of the Cell2 is less than 30%, the BLER of the UE1 is increased from 10% to 20%, and the BLER adjustment flag AdjustBLERFlag of the UE1 is set from 0 to 1; if the RB utilization ratio RBratio of the Cell2 is greater than or equal to 30%, go to execute S240.

In S270, the base station re-acquires the RB utilization ratio RBratio of the Cell2; if the RB utilization ratio RBratio of the Cell2 is greater than a second preset threshold that is 50%, the BLER of the UE1 is restored 10%, and the BLER adjustment flag AdjustBLERFlag of the UE1 is set from 1 to 0.

In a second example implementation which is applicable to a 5G system, the method includes the following.

In S310, a base station acquires a UE1 belonging to a Cell1 and an interference neighbor cell Cell2 of the UE1.

The Cell1 configures event A3, and when the UE1 reports the event A3 and the neighbor cell that the event A3 reports is the Cell2, the UE1 is an edge UE, and the interference neighbor cell of the UE1 is the Cell2.

In S320, the base station sets the BLER of the UE1 to 10%.

In S330, the base station sets the BLER adjustment flag AdjustBLERFlag of the UE1 to 0.

In S340, the base station acquires the RB utilization ratio BWPRBratio of each BWP of the Cell2.

In S350, the base station determines whether the RB utilization ratio BWPRBratio of the BWP of the Cell2 corresponding to the BWP activated by the UE1 is less than a first preset threshold that is 30% of the Cell2.

In S360, if the RB utilization ratio BWPRBratio of the BWP of the Cell2 corresponding to the BWP activated by the UE1 is less than 30%, the BLER of the UE1 is increased from 10% to 20%, and the BLER adjustment flag AdjustBLERFlag of the UE1 is set from 0 to 1; if the RB utilization ratio BWPRBratio of the BWP of the Cell2 corresponding to the BWP activated by the UE1 is greater than or equal to less than 30%, go to execute S340.

In S370, the base station re-acquires the RB utilization ratio BWPRBratio of each BWP of the Cell2; if the RB utilization ratio BWPRBratio of the BWP of the Cell2 corresponding to the BWP activated by the UE1 is greater than a second preset threshold that is 50% of the Cell2, the BLER of the UE1 is restored 10%, and the BLER adjustment flag AdjustBLERFlag of the UE1 is set from 1 to 0.

In a third example implementation which is applicable to a 4G system, the method includes the following.

In S410, a base station acquires a UE1 belonging to a Cell1 and interference neighbor cells Cell2, Cell3, and Cell4 of the UE1.

The Cell1 configures event A3, and when the UE1 reports the event A3 and the neighbor cells that the event A3 reports are the Cell2, the Cell3, and the Cell4, the UE1 is an edge UE, and the interference neighbor cells of the UE1 are the Cell2, the Cell3, and the Cell4.

In S420, the base station sets the BLER of the UE1 to 10%.

In S430, the base station sets the BLER adjustment flag AdjustBLERFlag of the UE1 to 0.

In S440, the base station acquires the RB utilization ratio Cell2RBratio of the Cell2, the RB utilization ratio Cell3RBratio of the Cell3, and the RB utilization ratio Cell4RBratio of the Cell4.

In S450, when N is 2, the base station determines whether the RB utilization ratio Cell2RBratio of the Cell2 is less than a first preset threshold that is 30% of the Cell2 and determines whether the RB utilization ratio Cell3RBratio of the Cell3 is less than a first preset threshold that is 30% of the Cell3.

In S460, if the RB utilization ratio Cell2RBratio of the Cell2 is less than the first preset threshold that is 30% of the Cell2 and the RB utilization ratio Cell3RBratio of the Cell3 is the first preset threshold that is 30% of the Cell3, the BLER of the UE1 is increased from 10% to 20%, and the BLER adjustment flag AdjustBLERFlag of the UE1 is set from 0 to 1; if the RB utilization ratio Cell2RBratio of the Cell2 is greater than or equal to the first preset threshold that is 30% of the Cell2 or the RB utilization ratio Cell3RBratio of the Cell3 is greater than or equal to the first preset threshold that is 30% of the Cell3, go to execute S440.

In S470, the base station re-acquires the RB utilization ratio Cell2RBratio of the Cell2, the RB utilization ratio Cell3RBratio of the Cell3, and the RB utilization ratio Cell4RBratio of the Cell4; if the RB utilization ratio Cell2RBratio of the Cell2 is greater than a second preset threshold that is 50% of the Cell2 and the RB utilization ratio Cell3RBratio of the Cell3 is greater than a second preset threshold that is 50% of the Cell3, the BLER of the UE1 is restored 10%, and the BLER adjustment flag AdjustBLERFlag of the UE1 is set from 1 to 0.

In a fourth example implementation which is applicable to a 4G system, the method includes the following.

In S510, a base station acquires a UE1 belonging to a Cell1 and interference neighbor cells Cell2, Cell3, and Cell4 of the UE1.

The Cell1 configures event A3, and when the UE1 reports the event A3 and the neighbor cells that the event A3 reports are the Cell2, the Cell3, and the Cell4, the UE1 is an edge UE, and the interference neighbor cells of the UE1 are the Cell2, the Cell3, and the Cell4. In S520, the base station sets the BLER of the UE1 to 10%.

In S530, the base station sets the BLER adjustment flag AdjustBLERFlag of the UE1 to 0.

In S540, the base station acquires the RB utilization ratio Cell2RBratio of the Cell2, the RB utilization ratio Cell3RBratio of the Cell3, and the RB utilization ratio Cell4RBratio of the Cell4.

In S550, when N is 2, the base station determines whether the RB utilization ratio Cell2RBratio of the Cell2 is less than a first preset threshold that is 20% of the Cell2 and determines whether the RB utilization ratio Cell3RBratio of the Cell3 is less than a first preset threshold that is 30% of the Cell3.

In S560, if the RB utilization ratio Cell2RBratio of the Cell2 is less than the first preset threshold that is 20% of the Cell2 and the RB utilization ratio Cell3RBratio of the Cell3 is the first preset threshold that is 30% of the Cell3, the BLER of the UE1 is increased from 10% to 20%, and the BLER adjustment flag AdjustBLERFlag of the UE1 is set from 0 to 1; if the RB utilization ratio Cell2RBratio of the Cell2 is greater than or equal to the first preset threshold that is 20% of the Cell2 or the RB utilization ratio Cell3RBratio of the Cell3 is greater than or equal to the first preset threshold that is 30% of the Cell3, go to execute S540.

In S570, the base station re-acquires the RB utilization ratio Cell2RBratio of the Cell2, the RB utilization ratio Cell3RBratio of the Cell3, and the RB utilization ratio Cell4RBratio of the Cell4; if the RB utilization ratio Cell2RBratio of the Cell2 is greater than a second preset threshold that is 50% of the Cell2 and the RB utilization ratio Cell3RBratio of the Cell3 is greater than a second preset threshold that is 70% of the Cell3, the BLER of the UE1 is restored 10%, and the BLER adjustment flag AdjustBLERFlag of the UE1 is set from 1 to 0.

The embodiments of the present application provide a method for adjusting a block error rate. The method includes: the BLER of an edge UE is set to a preset value, and the BLER adjustment flag of the edge UE is set to a first flag; in a case where the BLER of the edge UE is the preset value, the RB utilization ratio of each interference neighbor cell of at least one interference neighbor cell of the edge UE is acquired; whether the RB utilization ratio of each target interference neighbor cell of at least one target interference neighbor cell is less than a first preset threshold of the each target interference neighbor cell is determined, where the at least one target interference neighbor cell is N interference neighbor cells for interfering with the edge UE in the at least one interference neighbor cell that satisfy a preset condition, and N is a positive integer; and in a case where the RB utilization ratio of each target interference neighbor cell is less than the first preset threshold of the each target interference neighbor cell, the BLER of the edge UE is increased. In the present application, the BLER of the edge UE is increased by using the load condition of interference neighbor cells of the edge UE when the RB utilization ratio of each target interference neighbor cell is less than the first preset threshold of the each target interference neighbor cell, thereby achieving the adaptive adjustment of the BLER of the edge UE. Therefore, the throughput of the edge UE can be increased, thereby improving the user experience.

Figure 3:
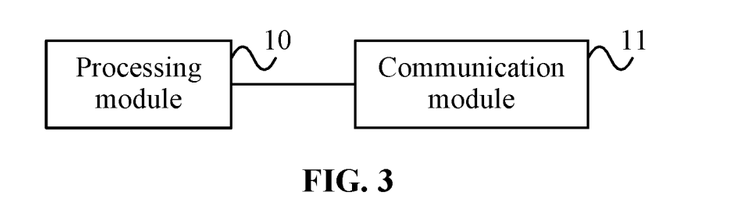
FIG. 3 is a structure diagram of an apparatus for adjusting a block error rate according to an embodiment of the present application.

FIG. 3 shows a structure diagram of an apparatus for adjusting a block error rate according to an embodiment. As shown in FIG. 3, the apparatus for adjusting a block error rate includes a processing module 10 and a communication module 11.

The processing module 10 is configured to, in a case where the BLER of an edge UE is a preset value, acquire the RB utilization ratio of each interference neighbor cell of at least one interference neighbor cell of the edge UE. The processing module 11 is configured to determine whether the RB utilization ratio of each target interference neighbor cell of at least one target interference neighbor cell is less than a first preset threshold of the each target interference neighbor cell, where the at least one target interference neighbor cell is N interference neighbor cells in the at least one interference neighbor cell for interfering with the edge UE that satisfy a preset condition, and N is a positive integer; and in a case where the RB utilization ratio of each target interference neighbor cell is less than the first preset threshold of the each target interference neighbor cell, increase the BLER of the edge UE.

The apparatus for adjusting a block error rate provided by this embodiment is configured to implement the method for adjusting a block error rate described in the preceding embodiments. The implementation principle and effects of the apparatus for adjusting a block error rate provided by this embodiment are similar to those of the method for adjusting a block error rate, and the details are not repeated here.

In an embodiment, in a case where the BLER of an edge UE is the preset value, the BLER adjustment flag of the edge UE is a first flag; the processing module 10 is further configured to, after the BLER of the edge UE is increased, change the BLER adjustment flag of the edge UE from the first flag to a second flag.

In an embodiment, the communication module 11 is further configured to, after the processing module 10 increases the BLER of the edge UE, re-acquire the RB utilization ratio of each interference neighbor cell of the at least one interference neighbor cell of the edge UE; the processing module 10 is further configured to determine whether the RB utilization ratio of each target interference neighbor cell of the at least one target interference neighbor cell is greater than a second preset threshold of the each target interference neighbor cell, and in a case where the RB utilization ratio of each target interference neighbor cell is greater than the second preset threshold of the each target interference neighbor cell, restore the BLER of the edge UE to the preset value.

In an embodiment, after the BLER of the edge UE is increased, the BLER adjustment flag of the edge UE is the second flag; the processing module 10 is further configured to, after the BLER of the edge UE is restored to the preset value, change the BLER adjustment flag of the edge UE from the second flag to the first flag.

In an embodiment, the communication module 11 is further configured to acquire an edge UE and at least one interference neighbor cell of the edge UE.

In an embodiment, the communication module 11 is configured to acquire the edge UE and at least one interference neighbor cell of the edge UE in the following manner: a first event reported by the edge UE is received, where the first event is used for indicating that a difference between the received power of at least one interference neighbor cell of the edge UE and the received power of the cell in which the edge UE is located is not less than a preset threshold; and the at least one interference neighbor cell indicated in the first event is determined as the at least one interference neighbor cell of the edge UE.

In an embodiment, one edge UE has one BLER adjustment flag.

In an embodiment, the RB utilization ratio of each interference neighbor cell of the edge UE is a cell-level RB utilization ratio or a BWP-level RB utilization ratio.

In an embodiment, the value of N is determined according to the intensity of interference that affects the edge UE and computational complexity.

In an embodiment, the first flag is 0, and a second flag is 1; or the first flag is 1, and the second flag is 0.

The embodiments of the present application further provide a communication node. The communication node includes a processor, and the processor is configured to, when executing a computer program, implement the method provided by any of the embodiments of the present application.

For example, the embodiment described below provides a structure diagram in which the communication node is a base station.

Figure 4:
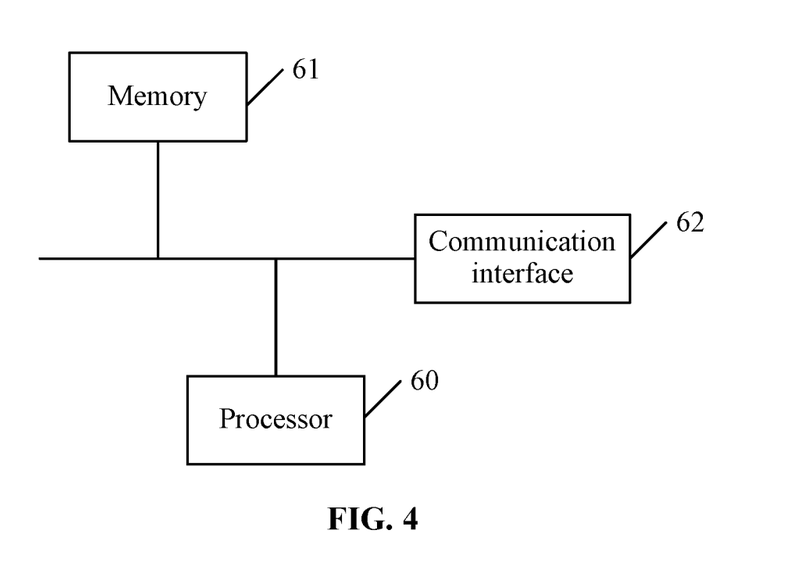
FIG. 4 is a structure diagram of a base station according to an embodiment of the present application.

FIG. 4 shows a structure diagram of a base station according to an embodiment. As shown in FIG. 4, the base station includes a processor 60, a memory 61, and a communication interface 62. The number of processors 60 in the base station may be one or more, and one processor 60 is illustrated as an example in FIG. 4. The processor 60, the memory 61, and the communication interface 62 in the base station may be connected via a bus or in other manners, and the connection via the bus is illustrated as an example in FIG. 4. The bus represents one or more types of bus structures, including a memory bus or memory controller, a peripheral bus, an accelerated graphics port, and a processor or local bus using any of a variety of bus architectures.

As a computer-readable storage medium, the memory 61 may be configured to store software programs, computer-executable programs and modules, such as program instructions/modules corresponding to the method in the embodiments of the present application. The processor 60 is configured to run the software programs, instructions and modules stored in the memory 61 to execute at least one of function applications and data processing of the base station, that is, to implement the method described above.

The memory 61 may include a program storage region and a data storage region. The program storage region may store an operating system and an application program required by at least one function, and the data storage region may store data created depending on the use of a terminal. In addition, the memory 61 may include a high-speed random-access memory and may also include a non-volatile memory such as at least one disk memory, a flash memory or another non-volatile solid-state memory. In some examples, the memory 61 may include memories that are remotely disposed with respect to the processor 60. These remote memories may be connected to the base station via a network. Examples of the preceding network include, but are not limited to, the Internet, an intranet, a network, a communication network, and combinations thereof.

The communication interface 62 may be configured to receive and send data.

The embodiments of the present application further provide a computer-readable storage medium. The computer-readable storage medium is configured to store a computer program, and the computer program, when executed by a processor, implements the method provided by any of the embodiments of the present application.

The computer storage medium in the embodiments of the present application may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. The computer-readable storage medium includes (a non-exhaustive list): an electrical connection having one or more wires, a portable computer disk, a hard disk, a random-access memory (RAM), a read-only memory (ROM), an electrically erasable programmable read-only memory (EPROM), a flash memory, an optical fiber, a portable compact disc read-only memory (CD-ROM), an optical memory, a magnetic memory or any suitable combination thereof. In the present application, the computer-readable storage medium may be any tangible medium including or storing a program. The program may be used by or used in conjunction with an instruction execution system, apparatus or device.

The computer-readable signal medium may include a propagated data signal with computer-readable program codes embodied therein, for example, in a baseband or as a part of a carrier wave. Such a propagated data signal may take any of a variety of forms, including, but not limited to, electro-magnetic, optical, or any suitable combination thereof. The computer-readable signal medium may be any computer-readable medium that is not a computer-readable storage medium and that can communicate, propagate, or transport a program for use by or in connection with an instruction execution system, apparatus or device.

The program codes included on the computer-readable medium may be transmitted via any suitable medium, including, but not limited to, wireless, wireline, optical fiber cable, radio frequency (RF), or any suitable combination thereof.

The computer program codes for performing operations of the present disclosure may be written in one or more programming languages or combinations of multiple programming languages. The programming languages include object-oriented programming languages (such as Java, Smalltalk, C++, Ruby, and Go) and conventional procedural programming languages (such as the "C" programming language or similar programming languages). The program codes may be executed entirely on a user computer, partly on a user computer, as a stand-alone software package, partly on a user computer and partly on a remote computer, or entirely on a remote computer or a server. In a case related to the remote computer, the remote computer may be connected to the user computer via any type of network including a local area network (LAN) or a wide area network (WAN) or may be connected to an external computer (for example, via the Internet through an Internet service provider).

It is to be understood by those skilled in the art that the term "user terminal" covers any suitable type of wireless user devices, for example, a mobile phone, a portable data processing apparatus, a portable web browser or a vehicle-mounted mobile station.

In general, the various embodiments of the present application may be implemented in hardware or special-purpose circuits, software, logic or any combination thereof. For example, some aspects may be implemented in hardware while other aspects may be implemented in firmware or software that may be executed by a controller, a microprocessor or other computing apparatuses, though the present application is not limited thereto.

The embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination thereof. Computer programs may be stored on the memory. The memory may be of any type suitable for the local technical environment and may be implemented by using any suitable data storage technology, such as, but not limited to, a ROM, a RAM, and an optical storage apparatus and system (a digital video disc (DVD) or a compact disc (CD)). The computer-readable medium may include a non-transitory storage medium. The data processor may be of any type suitable to the local technical environment such as, but not limited to, a general-purpose computer, a special-purpose computer, a microprocessor, digital signal processing (DSP), an application-specific integrated circuit (ASIC), a field-programmable gate array (FPGA), and a processor based on a multi-core processor architecture.

What is claimed is:

1. A method for adjusting a block error rate, comprising:
   in response to a block error rate (BLER) of an edge user equipment (UE) being a preset value, acquiring a resource block (RB) utilization ratio of each interference neighbor cell of at least one interference neighbor cell of the edge UE;
   determining whether an RB utilization ratio of each target interference neighbor cell of at least one target interference neighbor cell is less than a first preset threshold of the each target interference neighbor cell, wherein the at least one target interference neighbor cell is N interference neighbor cells for interfering with the edge UE in the at least one interference neighbor cell that satisfy a preset condition, and N is a positive integer; and
   in response to the RB utilization ratio of the each target interference neighbor cell being less than the first preset threshold of the each target interference neighbor cell, increasing the BLER of the edge UE.

2. The method of claim 1, wherein,
   in response to the BLER of the edge UE being the preset value, a BLER adjustment flag of the edge UE is a first flag; and
   after increasing the BLER of the edge UE, the method further comprises: changing the BLER adjustment flag of the edge UE from the first flag to a second flag.

3. The method of claim 2, wherein the edge UE has one BLER adjustment flag.

4. The method of claim 2, wherein
   the first flag is 0, and the second flag is 1; or
   the first flag is 1, and the second flag is 0.

5. The method of claim 1, after increasing the BLER of the edge UE, further comprising:
   re-acquiring the RB utilization ratio of the each interference neighbor cell of the at least one interference neighbor cell of the edge UE, and determining whether the RB utilization ratio of the each target interference neighbor cell of the at least one target interference neighbor cell is greater than a second preset threshold of the each target interference neighbor cell; and
   in response to the RB utilization ratio of the each target interference neighbor cell being greater than the second preset threshold of the each target interference neighbor cell, restoring the BLER of the edge UE to the preset value.

6. The method of claim 5, wherein,
   after increasing the BLER of the edge UE, a BLER adjustment flag of the edge UE is a second flag; and
   after restoring the BLER of the edge UE to the preset value, the method further comprises: changing the BLER adjustment flag of the edge UE from the second flag to a first flag.

7. The method of claim 5, wherein the RB utilization ratio of the each interference neighbor cell of the edge UE is a cell-level RB utilization ratio or a bandwidth part (BWP)-level RB utilization ratio.

8. The method of claim 6, wherein the edge UE has one BLER adjustment flag.

9. The method of claim 6, wherein
the first flag is 0, and the second flag is 1; or
the first flag is 1, and the second flag is 0.

10. The method of claim 1, before acquiring the RB utilization ratio of the each interference neighbor cell of the at least one interference neighbor cell of the edge UE, further comprising:
acquiring the edge UE and the at least one interference neighbor cell of the edge UE.

11. The method of claim 10, wherein the acquiring the edge UE and the at least one interference neighbor cell of the edge UE comprises:
receiving a first event reported by the edge UE, wherein the first event is used for indicating that a difference between received power of the at least one interference neighbor cell of the edge UE and received power of a cell in which the edge UE is located is not less than a preset threshold; and
determining the at least one interference neighbor cell indicated in the first event as the at least one interference neighbor cell of the edge UE.

12. The method of claim 1, wherein the RB utilization ratio of the each interference neighbor cell of the edge UE is a cell-level RB utilization ratio or a bandwidth part (BWP)-level RB utilization ratio.

13. The method of claim 1, wherein a value of N is determined according to an intensity of interference that affects the edge UE and computational complexity.

14. A communication node, comprising a processor;
wherein the processor is configured to, when executing a computer program, implement:
in response to a block error rate (BLER) of an edge user equipment (UE) being a preset value, acquiring a resource block (RB) utilization ratio of each interference neighbor cell of at least one interference neighbor cell of the edge UE;
determining whether an RB utilization ratio of each target interference neighbor cell of at least one target interference neighbor cell is less than a first preset threshold of the each target interference neighbor cell, wherein the at least one target interference neighbor cell is N interference neighbor cells for interfering with the edge UE in the at least one interference neighbor cell that satisfy a preset condition, and N is a positive integer; and
in response to the RB utilization ratio of the each target interference neighbor cell being less than the first preset threshold of the each target interference neighbor cell, increasing the BLER of the edge UE.

15. A non-transitory computer-readable storage medium configured to store a computer program, wherein the computer program, when executed by a processor, is configured to implement:
in response to a block error rate (BLER) of an edge user equipment (UE) being a preset value, acquiring a resource block (RB) utilization ratio of each interference neighbor cell of at least one interference neighbor cell of the edge UE;
determining whether an RB utilization ratio of each target interference neighbor cell of at least one target interference neighbor cell is less than a first preset threshold of the each target interference neighbor cell, wherein the at least one target interference neighbor cell is N interference neighbor cells for interfering with the edge UE in the at least one interference neighbor cell that satisfy a preset condition, and N is a positive integer; and
in response to the RB utilization ratio of the each target interference neighbor cell being less than the first preset threshold of the each target interference neighbor cell, increasing the BLER of the edge UE.

* * * * *